United States Patent [19]

Wilson

[11] Patent Number: 4,653,524
[45] Date of Patent: Mar. 31, 1987

[54] CONTROL VALVE ASSEMBLY

[76] Inventor: Warren M. Wilson, 809 Superior Dr., Huron, Ohio 44839

[21] Appl. No.: 809,474

[22] Filed: Dec. 16, 1985

[51] Int. Cl.⁴ .................................. G05D 11/03
[52] U.S. Cl. ........................ 137/110; 137/334; 137/340; 165/38
[58] Field of Search .............. 137/110, 625.29, 334, 137/340, 341; 165/38, 103

[56] References Cited

U.S. PATENT DOCUMENTS

| | | | |
|---|---|---|---|
| 3,232,336 | 2/1966 | Leslie | 165/38 |
| 4,077,545 | 3/1978 | Karls | 137/341 X |
| 4,219,044 | 8/1980 | Wilson | 137/340 |

FOREIGN PATENT DOCUMENTS 30989  7/1970  Japan ..................... 137/341

Primary Examiner—Robert G. Nilson
Attorney, Agent, or Firm—Tarolli, Sundheim & Covell

[57] ABSTRACT

An assembly for use in a system for heating water comprises a heat exchanger for heating cold water to produce overheated hot water and a blending chamber in which the overheated hot water is mixed with cold water to produce blended hot water. An inlet valve controls the flow of cold water to the heat exchanger. A bypass valve controls the flow of cold water into the blending chamber. A flow restrictor restricts the flow of cold water from the bypass valve into the blending chamber when the demand for blended hot water increases above a predetermined amount.

10 Claims, 6 Drawing Figures

CONTROL VALVE ASSEMBLY

BACKGROUND AND SUMMARY OF THE INVENTION

The present invention relates to a hot water heating system for blending cold water with overheated hot water to form a stream of hot water having a predetermined temperature. In particular, the present invention relates to a control valve assembly that maintains the stream of hot water at a nearly constant temperature over a wide range of flow rates of the hot water.

In many hot water heating systems such as institutional systems, cold water is heated by steam in a heat exchanger. For practical reasons, the output flow from the heat exchanger is overheated and is much too hot to be used at a hot water tap. Accordingly, the overheated water is blended with cold water in a blending chamber until a mixture having temperature suitable for the hot water tap is obtained.

Difficulties have been encountered in producing a control valve assembly that can maintain the temperature of the hot water substantially constant over a wide range of flow demand. To maintain the temperature of the hot water leaving the blending chamber substantially constant over the range of flow rates, the ratio between the overheated water arriving in the blending chamber and the cold water arriving in the blending chamber must be varied. There are two reasons for this. First, the pressure drop associated with the heat exchanger changes as the rate of flow through the heat exchanger changes. Second, the overheated water temperature tends to fall with increase of flow through the heat exchanger.

A substantial breakthrough in control valve assemblies for hot water heating systems described above has been achieved in a valve control assembly disclosed in U.S. Pat. No. 4,219,044 issued to the present inventor and incorporated herewith by reference.

In the control valve assembly disclosed in U.S. Pat. No. 4,219,044, the flow of cold water into the valve assembly is split. A portion of it flows through an inlet valve into the heat exchanger, and a portion of it flows through a by pass valve into the blending chamber. The ratio of the cold water flow into the heat exchanger and the cold water flow into the blending chamber is regulated by a controller. The controller comprises a diaphragm that actuates a valve stem connected with the inlet and bypass valves.

Two hot water temperature adjustments are provided to assure that the temperature of the hot water is very near constant over a wide range of demand. A first or low-flow temperature adjustment is made when the demand for blended hot water is small, about 10% of capacity. The amount of cold water admitted through the bypass valve into the blending chamber is adjusted by moving a bypass valve seat toward or away from the bypass valve member until the desired blended hot water temperature is achieved. The second or high flow temperature adjustment is made when the flow is about 50% of capacity.

While performing quite satisfactory at most flow rates, the control valve assembly of U.S. Pat. No. 4,219,044 experiences some difficulties in maintaining the desired blended water temperature at high flow rates. At high flow rates, the temperature of the overheated water that enters the blending chamber from the heat exchanger falls. This decrease in overheated water temperature results from increased flow rates through the heat exchanger. Accordingly, less cold water for blending is required at the high flow rates, while at lower flow rates an increasing amount of cold water for blending is required.

To provide for less cold water for blending at the high flow rates, a flow restrictor controls flow of the cold water into the blending chamber. The flow restrictor moves to restrict the flow of cold water into the blending chamber at the high flow rates so that less cold water enters the blending chamber.

According to the invention, the control valve assembly comprises an inlet valve and a bypass valve. A diaphragm controller which is actuated by the difference in the fluid pressure at the inlet and the outlet of the control valve assembly controls the positions of the inlet and bypass valves in accordance with the required flow rate of the hot water. A stem fixedly connected with the diaphragm of the diaphragm controller mounts the inlet and bypass valve. The inlet valve includes an inlet valve member and a valve seat with which the inlet valve member cooperates. The inlet valve member is fixedly connected to the stem. The bypass valve includes a bypass valve member which is also connected to the stem and a bypass valve seat. The restrictor is adjustably connected to the stem for joint movement therewith and relatively thereto. When the first, low-flow temperature adjustment is made, the amount of cold water admitted through the bypass valve into the blending chamber is adjusted by moving the bypass valve seat toward and away from the bypass valve member. The second or high-flow temperature is effected by moving the restrictor along the stem.

BRIEF DESCRIPTION OF THE DRAWINGS

The foregoing and other features and objects of the present invention will become more apparent upon a reading of the following specification made with reference to the accompanying drawings wherein.

DESCRIPTION OF A PREFERRED EMBODIMENT

A control valve assembly 10 constructed according to the present invention is designed for use in a system adapted to supply hot water at a substantially constant temperature over a wide range of flow rates. The system is particularly adapted for producing hot water for use in so-called institutional applications, locker rooms associated with athletic facilities, or anywhere else where the demand for hot water varies widely from time to time. The system in which the valve assembly according to the present invention is used is the same system that is described in U.S. Pat. No. 4,219,044.

Figure 1:
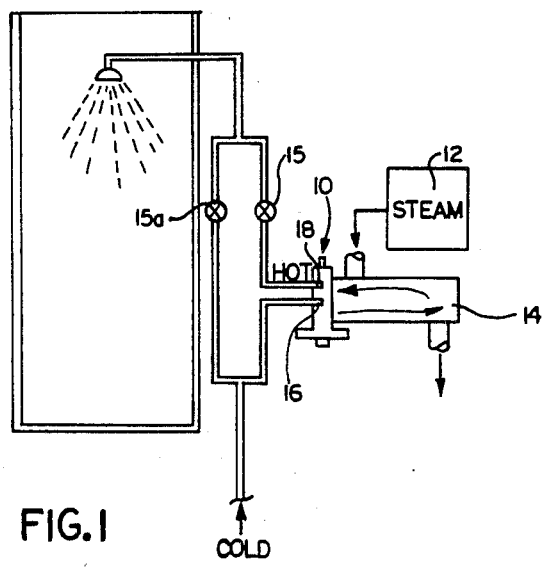
FIG. 1 is a schematic view of a hot water system constructed in accordance with the present invention.
Figure 3:
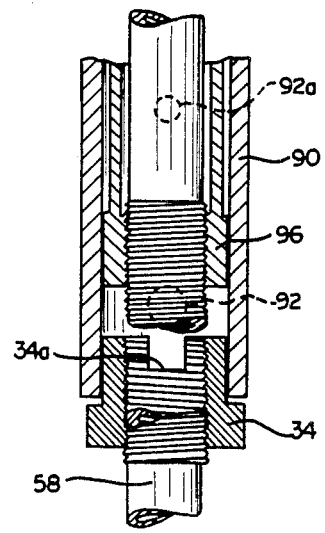
FIG. 3 is a sectional view on an enlarged scale of a portion of the control valve assembly of FIG. 2.

As shown in FIG. 1, hot water from a heat exchanger 14 is supplied to a hot water tap 15. The temperature of the hot water supplied to the hot water tap 15 is regulated by the control valve assembly 10. The valve assembly 10 blends a precisely controlled amount of cold water with overheated hot water from the heat exchanger 14. Steam supply 12 provides steam for heating cold water in the heat exchanger 14.

Figure 2:
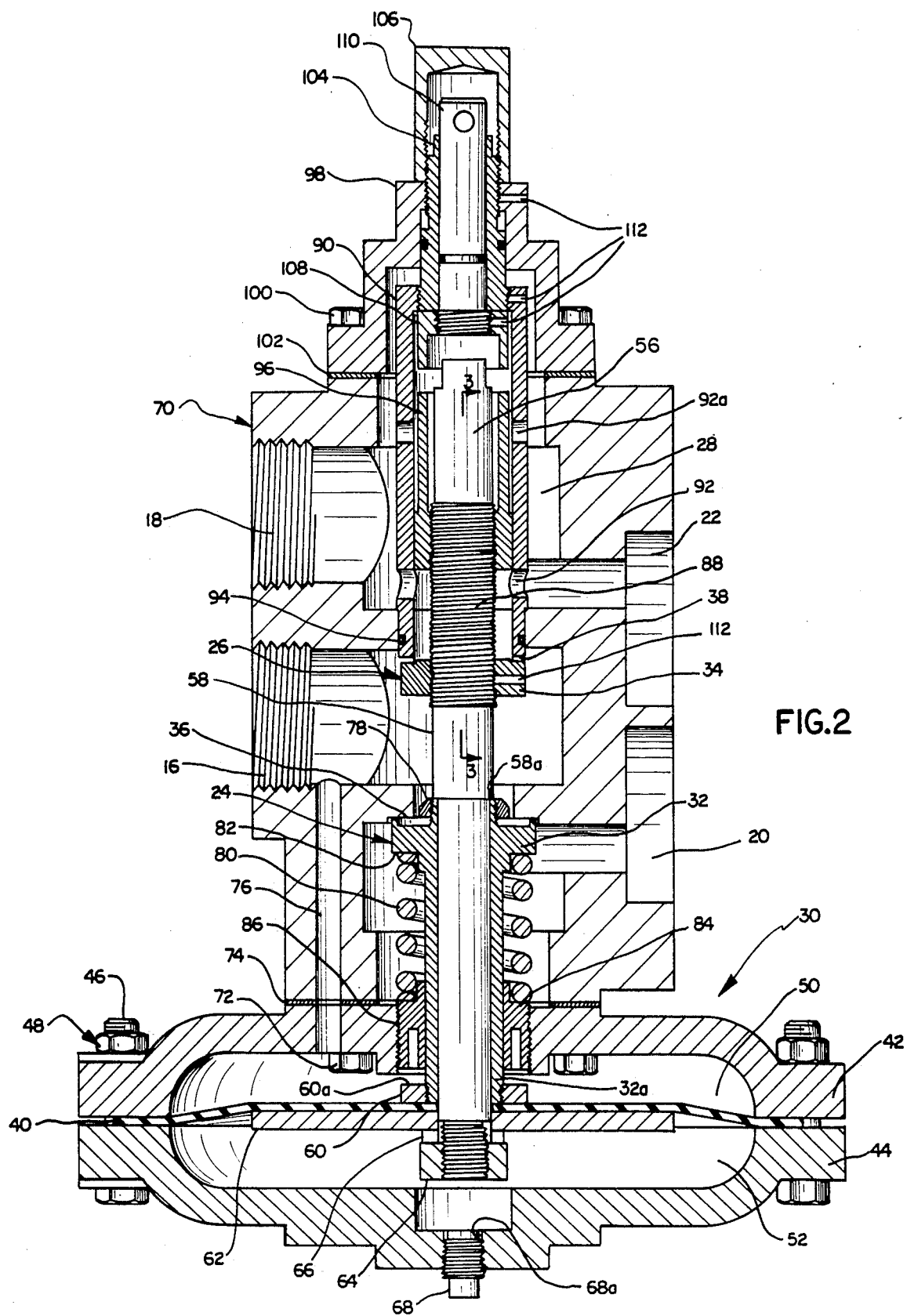
FIG. 2 is an axial sectional view of a control valve assembly of the present invention.

The valve assembly 10 is shown in detail in FIG. 2. The valve assembly includes a cold water inlet 16, a blended water outlet 18, and two ports 20 and 22 connected, respectively, with the inlet and outlet of the heat exchanger 14. An inlet valve 24 controls the flow of cold water to the heat exchanger, and a bypass valve 26 controls the flow of cold water into the blending chamber 28, where the cold water is blended with the overheated hot water from the heat exchanger 14 that enters the chamber 28 through the port 22.

The pressure drop between ports 20 and 22 equals the pressure drop across the heat exchanger, which is a function of the flow rate therethrough.

Both the inlet valve 24 and bypass valve 26 include valve members 32 and 34 cooperating valve seats 36 and 38, respectively. In FIG. 2 it is shown that both valve members 32 and 34 are cylindrical. However, the shape of the valve members is not critical, and they may be of any suitable form.

A controller 30 actuates the valves 24 and 26 in response to variations in the demand for hot water. The controller 30 includes a diaphragm 40 and upper and lower diaphragm cover members 42 and 44. The covers are connected by bolts 46 and nuts 48. The diaphragm 40 forms a movable barrier between an upper chamber 50 formed in the upper cover member 42 and a lower chamber 52 formed in the lower cover member 44. The upper and lower cover members 42 and 44 are generally cylindrical and have opposed coaxial cylindrical recesses that form the upper and lower chambers 50 and 52, respectively.

The blended water pressure reaches the lower chamber 52 through a central passage 56 of a tubular stem 58 which mounts both valves 24 and 26. The stem 58 is fixedly connected with the diaphragm 40 which is supported between a diaphragm retainer disc 60 and a diaphragm support disc 62. The lower end of the stem 58 may, for example, be threaded, and a nut 64 fixes the stem 58 to diaphragm support disc 62 through a lock washer 66.

A plug 68 blocks an opening 68a in the lower cover member 44. The controller 30 is attached to the control valve housing 70 by bolts 72. A gasket 74 is located between the controller 30 and the control valve housing 70.

The pressure acting on the top side of the diaphragm 40 is supplied through a passage 76 which opens into the cold water inlet 16 and the upper chamber 50.

The inlet valve member 32 at the upper end thereof abuts a shoulder 58a on the stem 58 and is provided, at the lower end thereof with shoulder 32a which abuts the upper end surface 60a of the diaphragm retainer disc 60. The foregoing structure assures that the inlet valve member 32 is held in a fixed axial position on the stem 58, and that the size of the opening defined by the inlet valve member 32 as it moves downward with the stem 58 is directly proportional to the amount of movement of the stem 58.

A range spring 80 biases the inlet valve member 32 and the stem 58 upward into a closed position shown in FIG. 2. The range spring 80 acts between a lower annular end surface 82 of the inlet valve member 32 and annular end surface 84 of a stem guide 86 that is fixed in the upper cover member 42, i.e., by threaded engagement therewith.

The bypass valve member 34 is also fixedly connected to the stem 58. The bypass valve member 34 has an internal thread engaging an externally threaded portion 88 on the stem 58. The bypass valve seat 38 is defined by a tubular sleeve 90 which also defines ports 92 through which the bypass cold water flows into the blending chamber 28. The port 92 has a circular cross section. The number of ports 92 may vary. In the described embodiment, the sleeve 90 has four such ports. The sleeve 90 also has one or a plurality of circular ports 92a which communicate the blending chamber 28 with the chamber into which stem passage 56 opens. A seal 94 prevents leakage between the blending chamber 28 and the cold water inlet 16.

The bypass valve member 34 defines a plurality of rectangularly shaped axial slots 34a in the body thereof. In the preferred embodiment, the bypass valve member has four such slots. However, the number of slots may vary. The slots 34a serve to increase flow of cold water into the blending chamber 28 with increased demand for hot water at the tap.

A flow restrictor 96 controls the flow of the cold water into the blending chamber at high flow rates. The flow restrictor has a threaded lower end that threadably engages the threaded portion 88 on the stem 58 and is adjustable relative to the stem. The restrictor 96 moves axially with the stem 58 to control flow of cold water through the ports 92.

A top cap 98 covers the sleeve 90 and is attached to the control valve body 70 by bolts 100. A gasket 102 is located between the top cap 98 and the control valve body 70.

The low-flow temperature adjustment of flow of cold water into the blending chamber is effected by means of an adjusting sleeve 104 mounted in the top cap 98. The adjusting sleeve 104 is attached at its lower end to the tubular sleeve 90 and moves therewith to thereby control the position of the bypass valve seat 38. The adjusting sleeve 104 has at the upper end thereof two flat surfaces adapted to be engaged by a wrench for rotating the adjusting sleeve 104. When the adjusting sleeve 104 is rotated, it moves axially relative to the top cap 98 and, thus, provides for axial movement of the tubular sleeve 90 to a desired position of the valve seat 38.

The high-flow temperature adjustment of the flow of cold water into the blending chamber 28 is effected by adjusting the restrictor 96 relative to the stem 58. The adjustment is made by rotating the adjusting rod 110. Rotation of the adjusting rod 110 causes rotation of trunion 108 which has projections which cooperate with projections on the restrictor 96 so that restrictor 96 rotates upon rotation of the rod 110. Because of the threaded engagement between the restrictor 96 and the stem 58, the restrictor moves relative to the stem 58. A bonnet 106 is provided for covering the adjusting sleeve 104 and adjusting rod 110 and for preventing unauthorized tampering therewith.

Lock screws 112 fix the bypass valve member 34 to the stem 58, the adjusting sleeve 104 to the sleeve 90, the top cap 98 to the adjusting sleeve 104, and the trunion 108 to the adjusting rod 110.

The operation of the control valve assembly is described below. When the system is not operating, the inlet valve 24 is completely closed. The bypass 26 valve is slightly open to provide cold water for blending with hot water leakage so that there is no flow of overheated hot water when the tap 15 opens.

Upon opening of the tap 15, the diaphragm controller 30 opens the valves 24 and 26 in response to the reduction in pressure in the blending chamber 28. This reduction in pressure is communicated to the lower chamber 52 of the controller 30 through the ports 92a and the passage 56 in the tubular stem 58. The pressure differences across the diaphragm 40 causes the diaphragm to move downward. The stem 58 fixedly connected to the diaphragm 40 also moves downwardly and open the valves 24 and 26 so that the cold water can flow through the inlet valve 24 into the heat exchanger and through the bypass valve 26 into the blending chamber 28. As both valves are affixed to the stem, they move equal incremental amounts. The flow area provided by the bypass valve 26 is characterized so that at low flow rates the proper ratio of the flow of cold water through the bypass valve 26 into the blending chamber and the flow of cold water to the heat exchanger through the valve 24 is achieved, and the preset discharge temperature remains substantially constant regardless of the total flow. Both flows increase with opening of the faucet 15 in this range.

Figure 4:
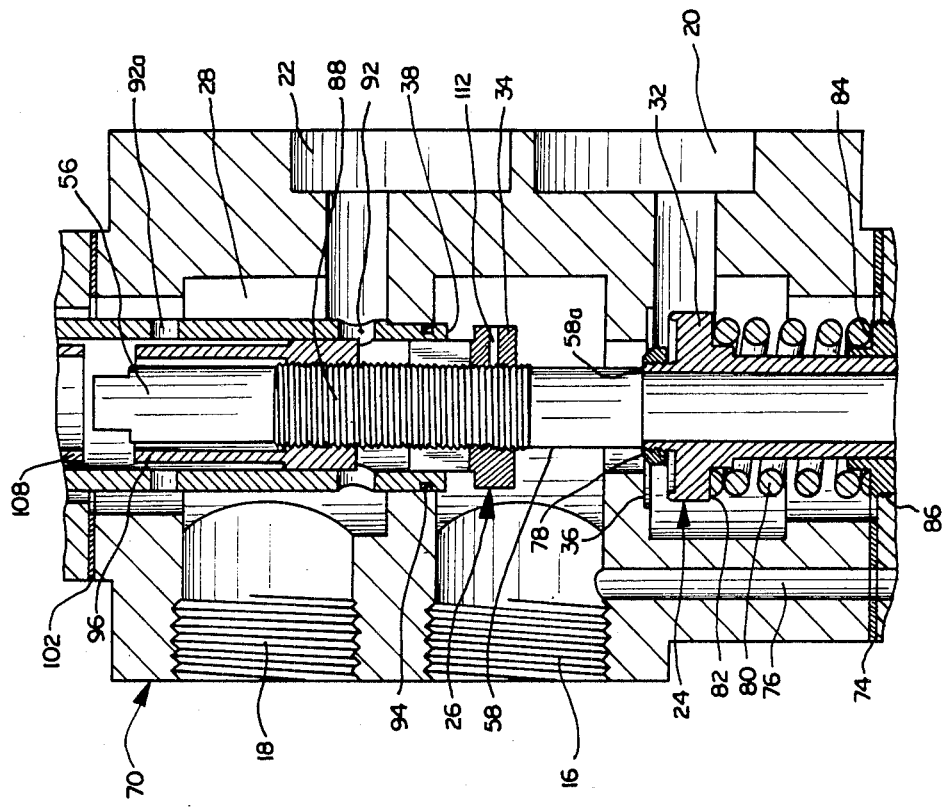
FIG. 4 is a sectional view similar to FIG. 2 but showing parts in a different position.

FIG. 4 shows the positions of the inlet and bypass valves 24 and 26 and the restrictor 96 when the demand for the blended hot water is low. The low end of the restrictor 96 only slightly obstruct the passage of the cold water through the ports 92 into the blending chamber 28. In this position, the restrictor 96 does not affect the amount of cold water flow into the blending chamber. This is because the cross sectional area of ports 92 is greater than the cross sectional area of the passage between the bypass valve member 34 and seat 38, and it is this passage that determines the cold water flow into the blending chamber 28 at relatively low flow rates.

Figure 5:
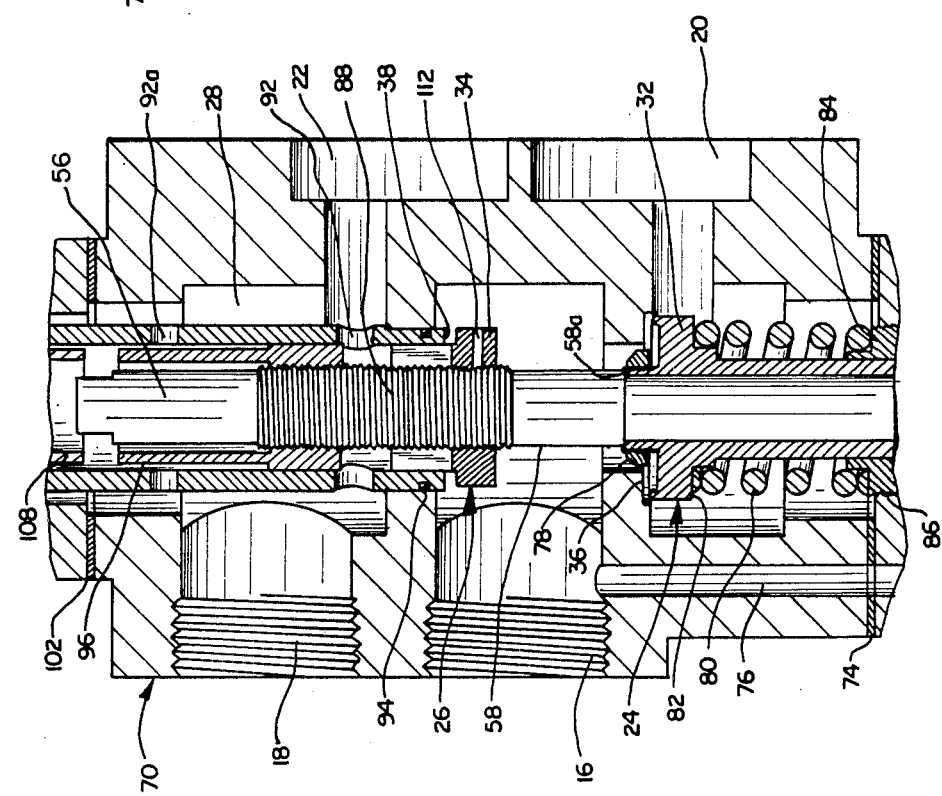
FIG. 5 is also a sectional view similar to FIGS. 2 and 3 but showing parts in still another position.

As the demand for hot water increases, the pressure in the blending chamber 28 is further reduced. The increased pressure difference across the diaphragm 40 causes the diaphragm to move further downward. The stem 58 also moves further downward increasing cross section flow area of valves 24 and 26, and more cold water flows into the heat exchanger 14 and the blending chamber 28. The restrictor 96 also moves further downward, and, at predetermined position of the stem 58, which corresponds to a rather high flow rate, blocks the ports 92 such that the open cross sectional area of ports 92 will be less than the cross sectional area of the passage between the bypass valve member 34 and the valve seat 38. Accordingly, the flow of cold water into the blending chamber 28 will be restricted, and less cold water will flow into the blending chamber. FIG. 5 shows the position of the inlet and bypass valves 24 and 26 and the restrictor 96 when the demand for blended hot water is high.

As previously noted, two adjustments are made to the control valve assembly 10 to assure that a constant preset discharge temperature is maintained. Initially, at low flow rates, both valves 24 and 26 are cooperating. Then, at intermediate flow rates, the flow area of the bypass valve 26 is increased, while the flow restrictor 96 decreases the flow area of the ports 92. Finally, the bypass flow decreases to zero at critical high flow rates when the overheated water temperature reaches the set point temperature.

The first adjustment is made at low flow conditions when the demand for hot water at the tap is small, about 10% of the maximum flow rate, and the flow rate through the heat exchanger is small, that is, when the inlet valve 24 and the bypass valve 26 are open a small amount as shown in FIG. 4. This adjustment is effected by moving the bypass valve seat 38 toward and away from the bypass valve member 34.

To move the bypass valve seat 38, the cap 106 is removed, and the adjusting sleeve 104 is rotated by a wrench to thereby move axially the tubular member 90 that mounts the bypass valve seat 38. First adjustment is effected to create a pressure drop against the bypass water flow, which pressure drop forces the cold water through the heat exchanger.

Figure 6:
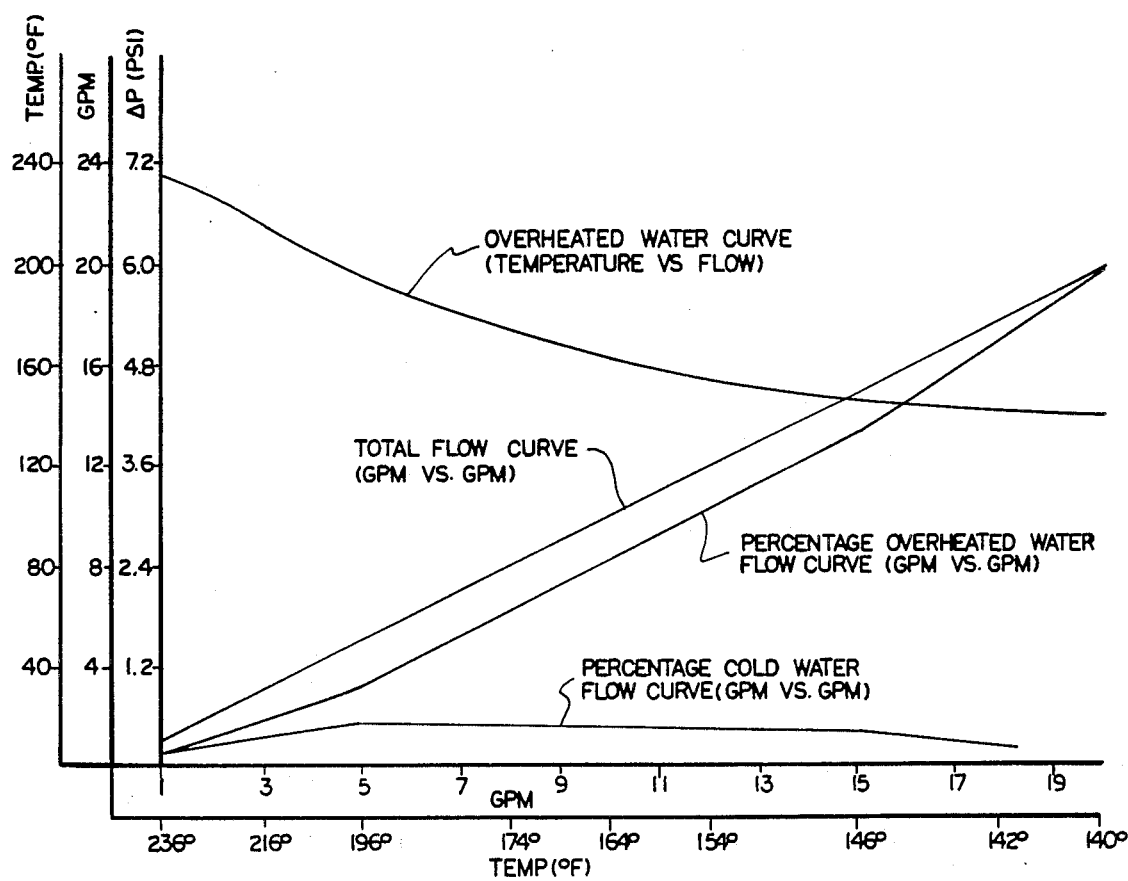
FIG. 6 is a graph that characterizes the operation of the present invention.

The second adjustment is made when the demand for blended hot water is large and constitute at least 50% of the maximum flow rate. This adjustment is made by positioning the flow restrictor 96 with respect to the port 92. By rotating the adjusting rod 110, movement is transmitted to the flow restrictor 96 and, the flow restrictor is moved somewhat downward reducing the area of the port 92. With an increased demand for hot water above a predetermined amount less cold water flows through the port 92 into the blending chamber. That corresponds to the reduced demand for cold water at high flow rates. Operation of the system will be more clearly understood from the graphs shown in FIG. 6.

The first graph shows that the temperature of the overheated hot water from the heat exchanger drops rather sharply at the increase in the flow rate up to 25% of the maximum flow rate and then begins to decline more gradually until it remains almost constant at flow rates close to the maximum flow rate.

The second graph shows that the flow rate of the hot water increases at almost constant ratio with respect to the demand. Not so for the overheated hot water from the heat exchanger.

The third graph shows the flow rate of the overheated hot water at flow rates up to 25% of the maximum flow rate increases proportionally to the demand but at a lesser ratio than the flow rate of the hot water from the system. This follows from the fact that the temperature of the overheated hot water is rather high. From 25% of the maximum flow rate to approximately 75% of the maximum flow rate, the flow rate of the overheated hot water increases almost at constant ratio with respect to the demand. Then, the ratio of flow of the overheated hot water increases again. This is due to the declining flow rate of the bypassed cold water.

The fourth graph shows changes in the flow rate of bypassed cold water during operation of the control valve assembly. After a first adjustment is made, at 10% of the maximum flow rate, the inlet valve and the bypass valve moves open in phase relationship providing for proportional increase in cold water flow into the blending chamber, as shown by the first portion of the graph. This phase movement takes place up to approximately 25% flow rate of the maximum flow rate. The flow restrictor during this phase of operation does not yet influence the flow of cold water into the blending chamber.

The second portion of the fourth graph shows that the need for cold water for blending remains almost constant at the range of flow rates from 25% to approximately 60% of the maximum flow rate. The bypass valve and the restrictor acting in series provide for desired, almost constant flow of cold water into the blending chamber.

At flow rates from 60% of the maximum flow rate and up to the maximum flow rate, there is a declining need for cold bypassed water, as represented by the third portion of the graph. To provide for reduced flow of the bypass cold water into the blending chamber, a second adjustment is made. The second adjustment is effected by proper adjusting of the restrictor to the bypass valve member, as discussed above.

While a particular embodiment of the invention has been shown and described, various modifications thereto will be readily apparent to those skilled in the art and, therefore, it is not intended that the invention be limited to the disclosed embodiment or details thereof, and departures may be made therefrom within the spirit and scope of the present invention as defined in the appended claims.

Having described a specific preferred embodiment of the invention, the following is claimed:

1. An assembly comprising:
   a heat exchanger for heating cold water to produce overheated hot water,
   a blending chamber in which the overheated hot water from said heat exchanger is blended with cold water to produce blended hot water suitable for use at a hot water tap,
   a first valve means for controlling flow of cold water into said heat exchanger according to the demand for hot water at the hot water tap,
   a second valve means for controlling flow of cold water into said blending chamber, and
   a flow restrictor means for restricting flow of cold water from said second valve into said blending chamber when the demand for blended hot water is increased above a predetermined amount.

2. An assembly as set forth in claim 1 further comprising actuator means for controlling the operation of said first and second valve means in accordance with the demand for hot water.

3. An assembly as set forth in claim 2, wherein said actuator means comprises a diaphragm controller including an axially movable stem and diaphragm means fixedly connected with said stem for axially moving the same in response to a varying demand for blended hot water, said first valve means and said second valve means comprising first and second valve members, respectively, said first and second valve members being fixedly mounted on said stem for axial movement therewith.

4. An assembly as set forth in claim 1, further including first adjusting means for adjusting said second valve means at a predetermined low flow rate of hot water and second adjusting means for adjusting said restrictor means at a predetermined high flow rates with respect to said second valve means.

5. An assembly as set forth in claim 4, wherein said first and second valve means and said flow restrictor means are located in a common housing means, and each of said first and second adjusting means includes means located outside said housing for facilitating operation of the same.

6. An assembly comprising a housing, said housing having a first inlet for receiving an incoming flow of cold water from a cold water source, a first outlet for supplying cold water to a heat exchanger, a second inlet for receiving overheated hot water from said heat exchanger, a blending chamber in which overheated hot water is blended with cold water to produce hot water, and a second outlet for supplying blended hot water to a point of use, first valve means for controlling the flow of cold water from said first inlet to said first outlet, second valve means for controlling the flow of cold water into said blending chamber, control means responsive to changes in the demand for blended hot water for varying the flow of cold water through said first and second valve means and for restricting flow of cold water into said blending chamber when the demand for hot water increases above a predetermined amount.

7. An assembly as set forth in claim 6 wherein said control means includes actuator means for controlling operation of said first and second valve means and a flow restrictor for restricting flow from said second valve means into said blending chamber when the demand for blended hot water increases above predetermined amount.

8. An assembly as set forth in claim 6, wherein said first valve means includes a first valve member and a first valve seat, said second valve means including a second valve member and a second valve seat, said actuator means including an axially movable stem and diaphragm means connected with said stem for moving said stem in one axial direction in response to increasing demand for blended hot water from said second outlet and in the opposite direction in response to decreasing demand for hot water, said second valve seat being defined by a cylindrical tubular member, said tubular member also defining port means through which cold water from said first inlet flows into said blending chamber, said first and second valve members being fixedly connected with said stem for joint axial movement therewith, said stem having an upper end portion projecting inside said tubular member, and said flow restrictor being located inside said tubular member and adjustably affixed on said stem.

9. An assembly as set forth in claim 7, wherein said flow restrictor means further comprises a trunnion connected with said restrictor at upper end of said restrictor, said trunnion being connected with an adjusting rod, rotation of said adjusting rod providing for axial and rotatable movement of said restrictor relative to said upper end portion of said stem.

10. An assembly as set forth in claim 8, wherein said rod projects outside said control valve assembly housing.

* * * * *